(12) United States Patent
Handelman et al.

(10) Patent No.: US 10,212,795 B2
(45) Date of Patent: Feb. 19, 2019

(54) ELECTRIC DEFENSE FIELD

(71) Applicants: Arthur Handelman, Rochester, MN (US); Richard H. Snow, Chicago, IL (US); Jack E. Bridges, Arlington Heights, IL (US)

(72) Inventors: Arthur Handelman, Rochester, MN (US); Richard H. Snow, Chicago, IL (US); Jack E. Bridges, Arlington Heights, IL (US)

( * ) Notice: Subject to any disclaimer, the term of this patent is extended or adjusted under 35 U.S.C. 154(b) by 442 days.

(21) Appl. No.: 14/858,128

(22) Filed: Sep. 18, 2015

(65) Prior Publication Data

US 2016/0088717 A1 Mar. 24, 2016

Related U.S. Application Data

(60) Provisional application No. 62/052,009, filed on Sep. 18, 2014.

(51) Int. Cl.
*H05C 1/00* (2006.01)
*A01K 3/00* (2006.01)
*A01M 29/24* (2011.01)

(52) U.S. Cl.
CPC ............... *H05C 1/00* (2013.01); *A01K 3/005* (2013.01); *A01M 29/24* (2013.01)

(58) Field of Classification Search
CPC ........ A01K 3/005; A01M 29/24; E04H 17/00; H05C 1/00; H05C 1/02; H05C 1/04; H05C 1/06; H05C 3/00
USPC .............................. 256/1, 10; 119/908; 43/98
See application file for complete search history.

(56) References Cited

U.S. PATENT DOCUMENTS

| | | | |
|---|---|---|---|
| 4,140,180 A | 2/1979 | Bridges et al. | |
| 4,196,329 A * | 4/1980 | Rowland | E21B 43/2401 166/248 |
| 4,318,088 A * | 3/1982 | Hunter | G08B 13/122 256/10 |
| 4,670,634 A | 6/1987 | Bridges et al. | |
| 5,445,111 A | 8/1995 | Smith | |
| 6,948,452 B2 * | 9/2005 | Wolfgram | A01K 3/005 256/10 |

(Continued)

OTHER PUBLICATIONS

K Vinsome, BCW McGee, and FE Vermeulen, Electrical Heating, J Can Petrol Technology 33 4, 1994.

(Continued)

*Primary Examiner* — Josh Skroupa
(74) *Attorney, Agent, or Firm* — Fish & Richardson P.C.

(57) ABSTRACT

An electric barrier to limit crossing of a border or perimeter. It consists of rows of vertical electrodes installed underground or above ground. It has two modes of operation. In an RF heating mode a generator powers electric fields to heat the ground in a pattern around the fence. A temperature may be reached which makes human occupation of tunnels untenable. Humans may also be subjected to RF radiation effects, especially if the frequency is tuned to a resonant frequency of tunnel cavities. Detection of a resonant frequency by suitable instrumentation may also indicate the presence of tunnels. In another mode occupants of a tunnel may be subjected to shock from an electric pulse, without heating, depending on small amounts of moisture to transmit the pulse through soil to the tunnel.

8 Claims, 4 Drawing Sheets

(56) References Cited

U.S. PATENT DOCUMENTS 7,994,962 B1 *  8/2011  Ben-Shmuel .......... H01Q 19/18
                                              342/13

OTHER PUBLICATIONS

RD Carlson, EF Blase, and JR McLendon, Development of the IIT Research Institute RF Heating Process for In Situ Shale/Tar Fuel Extraction—An Overview, 14$^{th}$ Oil Shale Symposium, Colorado School of Mines, Golden CO, 1981.
Harsh Dev, JE Bridges, and GC Sresty, Decontamination of Hazardous Waste Substances from Spills and Uncontrolled Waste Sites by Radio Frequency In Situ Heating, Hazardous Material Spills Conference Proceedings, Apr. 9-12, 57-64, 1984.
Harsh Dev and Douglas Downey, Zapping Hazardous Waste, Civil Engineering 43-45, Aug. 1988.
Federal Communications Commission, OET Bulletin No. 56, *Questions and Answers About the Biological Effects and Potential Hazards of Radio frequency Electromagnetic Fields*, 4ed 1999.

* cited by examiner

ELECTRIC DEFENSE FIELD

CROSS REFERENCE TO RELATED APPLICATIONS

The present application claims priority to U.S. Provisional Application 62/052,009 filed Sep. 18, 2014 and entitled "Electric Defense Field," which application is hereby incorporated herein by reference in its entirety.

TECHNICAL FIELD

This disclosure relates generally to the field of electric fences.

BACKGROUND

When two countries share a border, it sometimes occurs that occupants of one side wish to surreptitiously cross the border, either to carry on forbidden trade, or to immigrate, or to conduct clandestine military operations. These crossings are sometimes done by digging tunnels under the border from one side to the other. In such cases the entered country may wish to prevent such surreptitious entry. Interlopers may also dig tunnels to gain entry to sensitive installations such as electric grid facilities. Such entry can be prevented by installing an underground electric fence. The fence can also be used to protect against entry into sensitive installations such as electric power stations.

Constructing such a fence may be a more peaceful way of preventing such illicit activity than invading the foreign territory to destroy existing tunnels.

Similarly, a non-contact electric fence may be installed above ground. Anything, including land, a building or a ship, could be protected by the electric fence.

Electric fences are well known in air, in the form of cattle fences. A pulse of voltage is applied periodically, at a potential sufficient to deter contact with the fence by people or animals, but less than lethal. Fishermen know that by placing a metal electrode in the ground and energizing with the positive terminal from a household electric outlet, earthworms can be made to wriggle to the surface and be collected for bait. These applications use low frequency current, which is carried by water containing a small amount of dissolved salts. The worms are in contact with the soil and become part of the circuit. At least one person has been killed by walking on the ground near a power transmission line that accidently was grounded. People have been killed by swimming near boats that are leaking current from connected shore power.

Pulses may be generated by storing electric energy in capacitors or inductors, and releasing the energy across the electrodes suddenly. The circuit is similar to that used for an automobile spark plug. A direct current is caused to flow at a relatively low voltage in the primary winding of a coil, and when the primary switch is opened, a spark jumps a gap in the secondary at high potential. Alternatively, a capacitor can be charged and suddenly released, as is done in a method that replaces dynamite in treating oil wells (Blue Spark Inc. website.) The pulse also emits electro-magnetic radio waves, unless these are damped by a capacitor. In fact such pulses were the first method to transmit radio communications.

Electric fences have been used in water to prevent migration of undesired fish up a river (DV Smith, 1995.) Their method also makes use of pulses.

We have not found previous attempts to provide an electric fence in soil. However, Vinsome et al 1994 passed low frequency (60 Hz) current between pipes in a pattern of wells in order to produce oil. The electric current stops flowing when the soil dries out. In desert regions there may be little moisture to begin with.

Radio-frequency (RF) can penetrate soil better than low frequency. Rowland and Newton 1980 patented an RF antenna placed in a borehole to heat the surrounding earth and produce oil from oil shale. Like a microwave oven, the heating does not require a conducing path, but depends on exciting vibrations of polar molecules, even traces of water. The design was based on radio communication antennas that operate in air, and did not work well in the earth, which absorbs RF more strongly than air. Their antenna produced an uneven pattern of heating.

Bridges et al 1979 revealed an array of three rows of RF electrodes to more uniformly heat the deposit between the rows. The array was tested on a pilot scale first on oil shale and later on oil sands (Carlson et al 1981.) Later Dev et al 1984 and 1988 described use of the method to remediate hazardous waste sites, which they successfully heated by such arrays of vertical electrodes placed in boreholes.

In treating one of the hazardous waste sites Bridges et al 1987 and Dev et al 1988 heated the soil by placing RF electrodes on the surface of the ground, in a pattern of alternating positive and negative electrodes. The soil was heated for a depth of a few meters by fringing fields from the electrodes. Heating to greater depths was not achieved, and a row of vertical electrodes was not tried.

The potential hazards associated with RF electromagnetic fields are discussed in the FCC's OET Bulletin No. 56.

SUMMARY

The PyroPhase Defense Array can quickly and easily establish an impenetrable electric barrier underground that would prevent the excavation of new tunnels or the use of existing ones. It has two modes of operation: a heating mode, and an electric field mode. It can also form a non-contact fence above ground.

In particular embodiments the defense array consists of rows of vertical electrodes installed underground or above ground. It has two modes of operation. In an RF heating mode a generator powers electric fields to heat the ground in a pattern around the fence. A temperature may be reached which makes human occupation of tunnels untenable. Humans may also be subjected to RF radiation effects, especially if the frequency is tuned to a resonant frequency of tunnel cavities. Detection of a resonant frequency by suitable instrumentation may also indicate the presence of tunnels. In another mode occupants of a tunnel may be subjected to shock from an electric pulse, without heating, depending on small amounts of moisture to transmit the pulse through soil to the tunnel. When rows of electrodes are installed above ground, RF fields may be produced with intensity high enough to cause a sensation of burning or other harmful physiological effects to deter entrance. An electro-magnetic pulse either above or below ground may disable electronic or electric circuitry.

In another mode of operation, an RF beam of focused energy is propagated in a desired direction, with selected width, by means of a dish or similar antenna, so as to cause harmful effects in approaching humans, or to incapacitate electronic devices, or to detonate explosives, or stop vehicles by interfering with electric circuitry, or other effects due to metals absorbing RF energy.

Other aspects, features, and advantages will be apparent from the description and drawings, and from the claims.

BRIEF DESCRIPTION OF THE DRAWINGS

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The features and advantages of the inventive concepts disclosed herein will become more apparent from the detailed description set forth below when taken in conjunction with the drawings.

DETAILED DESCRIPTION

Figure 1:
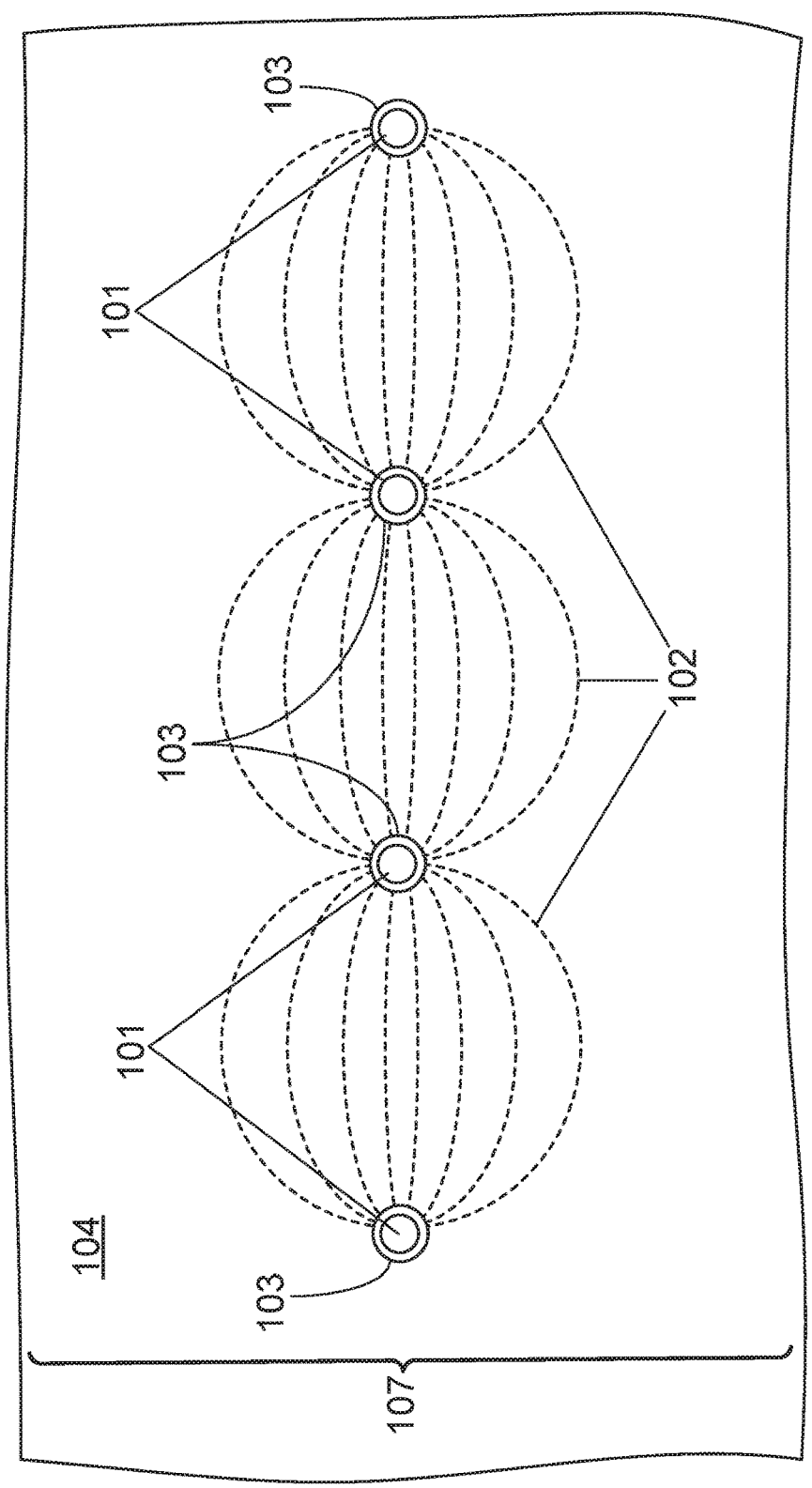
FIG. 1 is a plan view of a row of electrodes and the fringing fields around the electrodes.

The array consists of one or more rows of electrodes at spacings of one to more than 10 m, with 5 to 10 m being a preferred distance. They may be placed on the surface to form an above ground fence, or placed in boreholes in the ground to deter tunneling. The electrodes may be powered from an RF generator. If a single row is used, alternate electrodes are energized from the positive and negative terminals of the generator. A fringing electric field that is produced between and adjacent to the electrode row is illustrated in FIG. 1. A fringing electric field penetrates to a width similar to the spacing between electrodes, when sufficient power is applied. The vertical extent is determined by the length of the electrodes. The frequency may typically be in the MHz range.

If multiple rows are installed, the volume between the rows may be electrified, especially when three rows or multiples thereof are used. With multiple rows, alternate rows are connected to the positive or negative terminals as described by Bridges et al 1979. Multiple rows tend to contain the electric field so that it is more uniform, which may be helpful depending on the soil properties and other conditions. But single rows are more easily installed.

Operating Modes. In the RF underground heating mode, fringing fields will heat the ground in a pattern around the fence to a selected temperature, which may be 100 degrees Celsius. This will make it untenable for anyone to tunnel through, whether or not the location of the tunnels along the length of the array is known. When the array is powered down, the ground will maintain lethal temperatures for a few months, making the array impervious to a power interruption. It can be periodically reheated. To apply heat, the RF power is applied to the electrodes over a period of time, which may range up to a month or even a year, depending on the power supplied by the RF generator and the dimensions of the electrode array. The time and power level will determine the energy supplied.

The required energy may be calculated from a heat balance on the volume controlled by the geometry of the heated zone. It depends primarily on the heat capacity of soil, which normally averages 2.2 calories/gram, and the desired temperature. If any water is present to be evaporated, the heat of evaporation must also be supplied, if a temperature of 100 degrees Celsius or more is selected. In one implementation an electric fence one kilometer long and 100 m deep may require heating with 1.5 Mw power input over a period of one month. A slower heating rate requires a proportionately lower power rate.

The underground RF heating mode may also subject individuals in tunnels to RF radiation effects. Exposure of persons to RF radiation in tunnels can lead to physiological effects, primarily burning. RF heating can affect inner organs too. When RF heating is in effect, physiological symptoms may dissuade persons from working under the border.

If a tunnel is present within the electric field, it may form a resonant cavity. At the resonant frequency the power transmitted to the cavity is enhanced. The frequency may be varied to find the resonant frequency which tunes the cavity. The resonant frequency may be detected by observing an oscilloscope trace of current versus voltage as in FIG. 2. The power is the product of the voltage times the frequency, integrated over a cycle of such curves. The power will be a maximum at the tuned frequency. The observation of a maximum may indicate the presence of a tunnel.

To provide continuous electric fields with a high enough potential to cause shock is difficult, especially at RF frequencies, because of the cost. Instead, pulses may be used. The Underground electric pulse mode uses the same row or rows of buried electrodes, but does not require heating to any specific temperature. Instead, the objective is to supply electric shock to make entry in tunnels untenable.

A pulse differs from continuous RF heating. A pulse is generated by storing and then releasing direct current, rather than alternating current such as RF. Furthermore in order to penetrate the ground between electrodes with a pulse, the soil must contain some moisture to conduct a current. Since the treatment is intermittent, the soil does not heat up much and does not eventually dry out as in continuous RF heating. Because the pulses are not continuous, a higher level of power can be applied in pulses with less investment in electric source capacity.

When the current is carried by moisture in the soil around a tunnel, it can shock a person who contacts the walls of the tunnel. Electric shock can cause respiratory failure and cardio effects. Since the pulse also has RF components, these can be more readily by carried through the soil and into the tunnel without contact, and can cause physiological effects. An electro-magnetic pulse can also disable or burn out electric circuitry.

Above Ground RF Mode. The electric fence can also be deployed above ground. It may be more cost effective than a physical fence, or it could be applied as a secondary barrier to stop those who penetrate a physical fence. It may be more difficult to defeat because the electric field deters approach, and does not rely on contact for deterrence. It may consist of a similar row of electrodes, but installed on the surface.

An RF field may be applied between electrodes with intensity high enough to cause heating and a sensation of burning, or other physiological damage to a person's organs. Alternatively, an electro-magnetic pulse may be applied sufficient to cause physiological effects or to degrade electronic or electric circuitry.

Projected Beam Mode. In another mode of operation, an RF beam of focused energy can be propagated in a desired direction, with selected width, by means of a dish or similar antenna. The beam can be of selected intensity, so as to cause an effect ranging from an unpleasant sensation, up to lethality. The effective range may be governed by the strength of the power source and atmospheric conditions. If the beam is narrow, the intensity will fall off slowly with distance. Any metal object will react to the beam by absorbing energy. It can also be configured so as to damage electronics, or to remotely detonate explosives being brought into the zone to be defended, whether hidden or not.

The beam can be directed along a perimeter to be defended. It can also be directed from the ramparts of ships or ground installations toward specific objects or locations to repel or injure boarders, or to prevent structures from being scaled. For example by interfering with electric circuits it could stop at a safe distance a car carrying suicide bombers or a boat carrying pirates. It does not require fixed antennas, but could be mounted on a truck for mobile implementation. Once installed it can be easily dismantled by the operators. It has no negative environmental effects other than the presence of damaged items. When the system is not operating, there is no danger to human life.

FIG. 1 represents a row of electrodes 101, placed vertically either on the surface or in boreholes 103. Alternate electrodes are connected to positive and negative terminals of an RF source or a pulse generator 105. Dashed lines 102 represent the pattern of electric fields that are set up between the electrodes 101 to form a barrier 107. The field is strongest where the lines are close together, near the axis of the fence.

Figure 2:
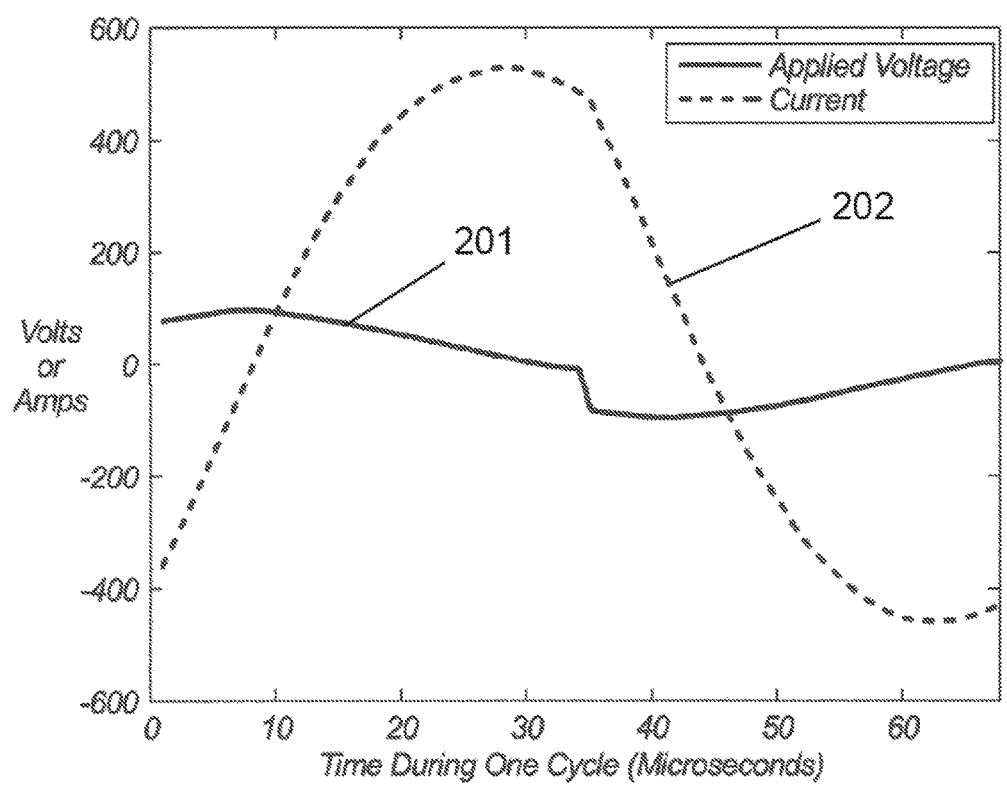
FIG. 2 illustrates an oscilloscope trace of the current observed and the voltage applied to a fence of electrodes for a cycle in RF mode.

FIG. 2 represents an oscilloscope trace of the voltage and current applied to a fence of electrodes. The form of the voltage curve 201 depends on the character of the RF source, but it cycles with a definite frequency. One cycle is shown. The fence has electrical impedance that determines how much current will flow and the shape of the curve over the duration of each cycle. In this example the current 202 approximates a sine wave. The power transmitted into the material around the electrodes is the product of voltage times amperage an any given instant. The integral of this product over the length of a cycle is the cumulative power or the energy transmitted per cycle.

Figure 3:
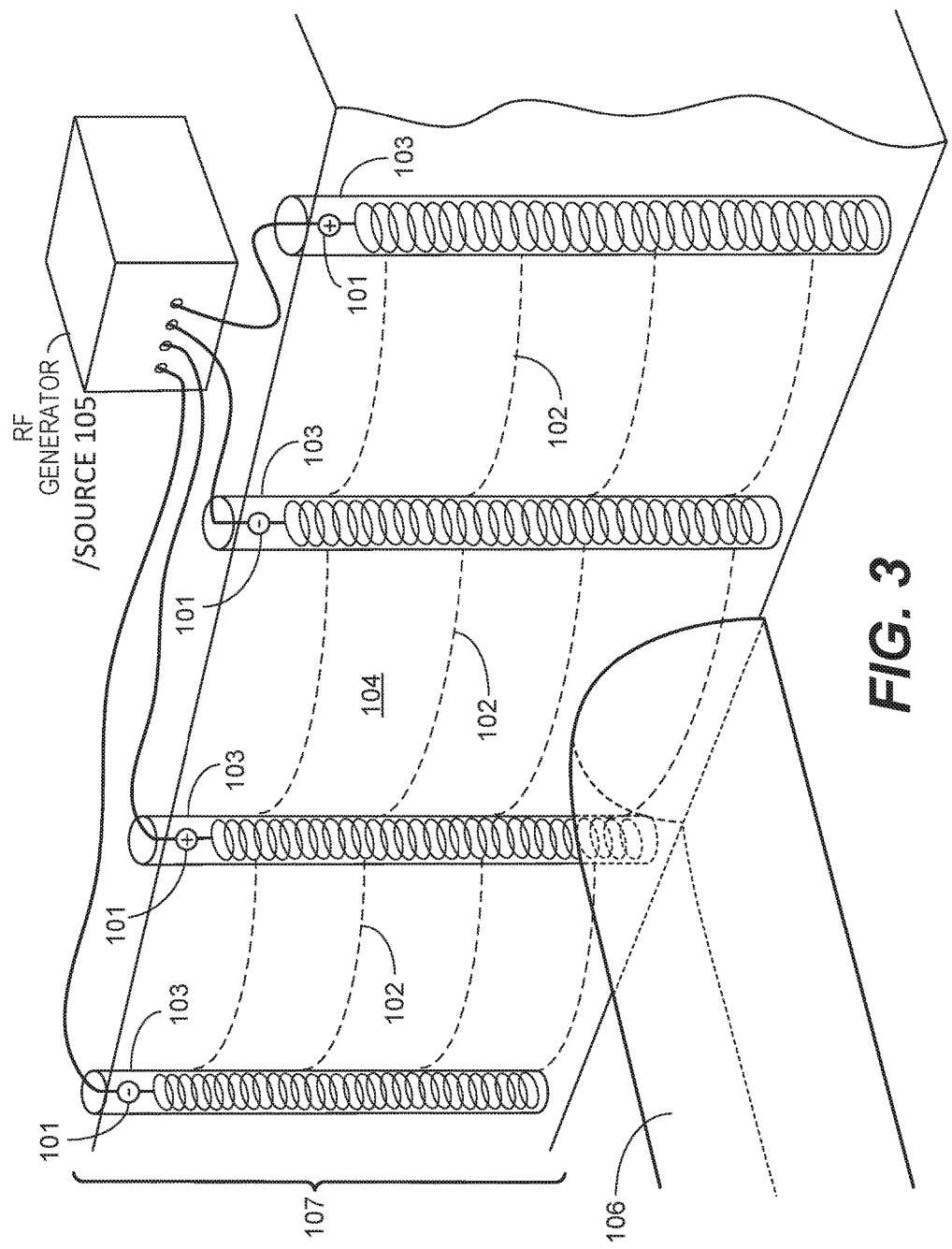
FIG. 3 is a perspective view illustrating the row of electrodes 101 of FIG. 1.
Figure 4:
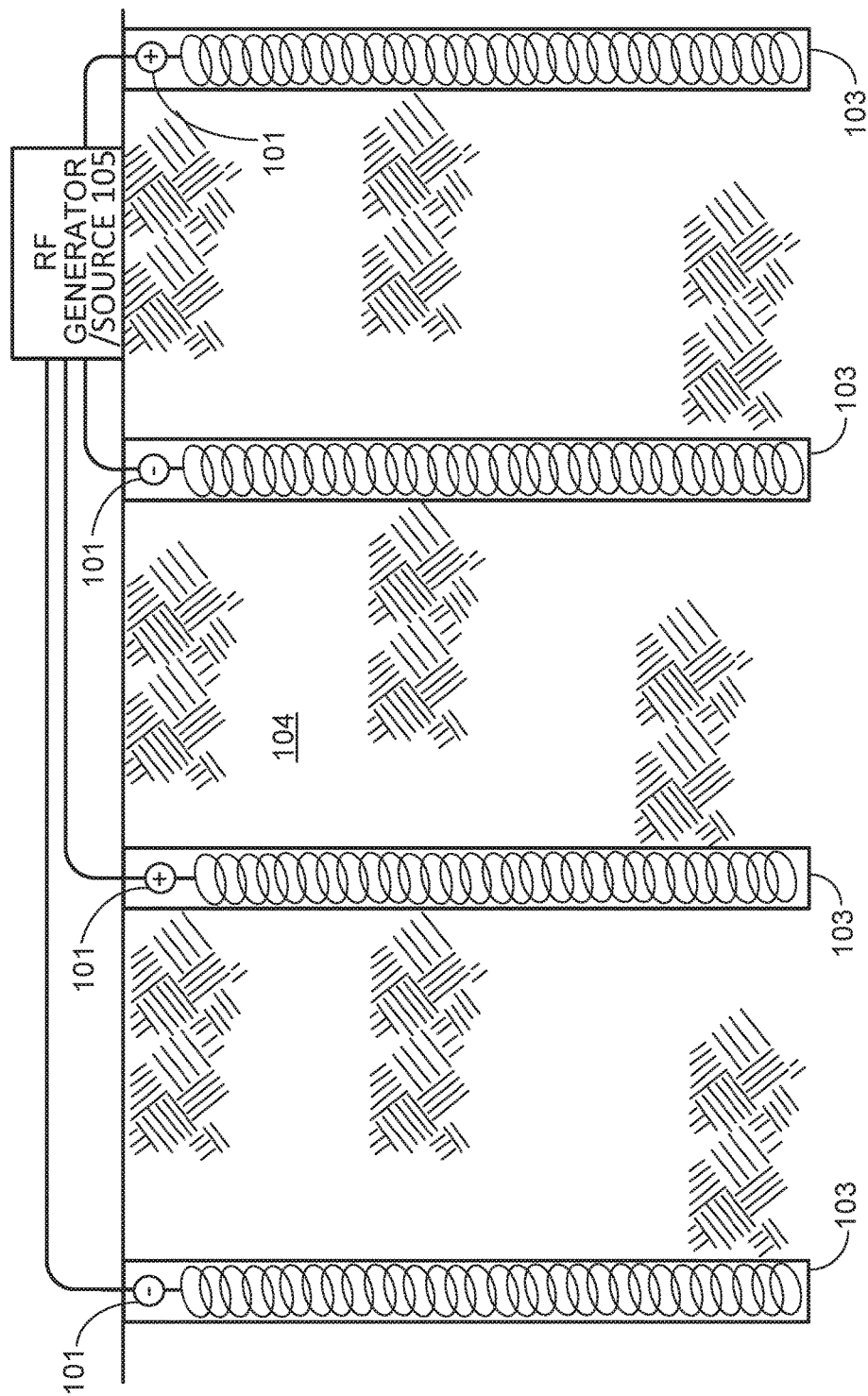
FIG. 4 is a side view showing the electrodes 101, the boreholes 103, the barrier 107, the RF source/pulse generator 105, and the ground 104.

FIG. 3 is a perspective view illustrating the row of electrodes 101 of FIG. 1, placed vertically in the boreholes 103 formed in the ground 104. The alternate electrodes are connected to positive and negative terminals of the RF source or a pulse generator 105. Alternate electrodes are energized via the RF source/pulse generator 105 to create the electric field 102 thereby forming a barrier 107 under the ground 104 to deter crossing of a border or perimeter of an area through a tunnel 106 created in the ground 104. FIG. 4 is a side view showing the electrodes 101, the boreholes 103, the barrier 107, the RF source/ pulse generator 105, and the ground 104.

What is claimed is:

1. A method of preventing underground access across a border or perimeter of an area through a tunnel created underground, the method comprising:
    installing an electric barrier by positioning one or more rows of electrodes in boreholes in the ground, each one of the one or more rows of electrodes comprising a plurality of electrodes comprising alternating positive and negative electrodes that extend to a depth underground; and
    energizing alternate electrodes of the plurality of electrodes via a radio frequency (RF) generator connected to the plurality of electrodes so as to induce electric fields within the earth around and between the electrodes, thereby to prevent underground access across the border or perimeter through the tunnel.

2. The method of claim 1 whereby sufficient RF power is supplied over a time long enough to heat the earth in a zone around and adjacent to the electric fields to an elevated temperature.

3. The method of claim 1 whereby sufficient voltage is applied between electrodes so that an electric field is generated in a zone around and adjacent to the electric fields.

4. The method of claim 2, wherein the elevated temperature is at or above 100 degrees Celsius.

5. The method of claim 1, further comprising varying a frequency of power energizing the alternate electrodes.

6. The method of claim 5, further comprising detecting a resonant frequency of the power.

7. The method of claim 1, wherein energizing alternate electrodes comprises energizing the positive electrodes.

8. A method of preventing underground access across a border or perimeter of an area through a tunnel created underground, the method comprising:
    installing an electric barrier by positioning one or more rows of electrodes in boreholes in the ground, each one of the one or more rows of electrodes comprising a plurality of electrodes comprising alternating positive and negative electrodes that extend to a depth underground; and
    energizing alternate electrodes of the plurality of electrodes via a source of electric pulses connected to the plurality of electrodes so as to induce electric fields within an area underground around and between the electrodes, thereby producing electric shock symptoms to a person entering the area adjacent to the electric fields.

* * * * *